(12) United States Patent
Demmel et al.

(10) Patent No.: US 7,698,995 B2
(45) Date of Patent: Apr. 20, 2010

(54) APPARATUS AND METHOD OF THERMALLY TREATING A CONFECTIONERY MASS

(75) Inventors: Lucian Demmel, Bad Liebenwerda (DE); Erhard Hilker, Lemgo (DE); Klaus Markwardt, Laatzen (DE)

(73) Assignee: Chocotech GmbH, Wernigerode (DE)

( * ) Notice: Subject to any disclaimer, the term of this patent is extended or adjusted under 35 U.S.C. 154(b) by 1710 days.

(21) Appl. No.: 10/867,111

(22) Filed: Jun. 14, 2004

(65) Prior Publication Data

US 2004/0253364 A1    Dec. 16, 2004

(30) Foreign Application Priority Data

Jun. 13, 2003    (DE)  ................. 103 26 792

(51) Int. Cl.
    *A47J 27/00*    (2006.01)
(52) U.S. Cl. .................... 99/348; 99/483; 366/132
(58) Field of Classification Search .............. 99/348, 99/483; 366/144–149, 337, 132–134, 141, 366/151.1; 165/159, 145, 165
    See application file for complete search history.

(56) References Cited

U.S. PATENT DOCUMENTS

| | | | | |
|---|---|---|---|---|
| 2,052,856 A | * | 9/1936 | Heinrich | ...................... 122/249 |
| 2,391,244 A | * | 12/1945 | Jackson | ....................... 165/159 |
| 3,045,981 A | * | 7/1962 | Hendrickson | ................. 165/82 |
| 3,348,610 A | * | 10/1967 | Fromut | ......................... 165/158 |
| 4,127,389 A | * | 11/1978 | Hackemesser et al. | ...... 422/201 |
| 7,387,429 B2 | * | 6/2008 | Markwardt | ................. 366/132 |

FOREIGN PATENT DOCUMENTS

| | | |
|---|---|---|
| DE | 1 607 811 | 7/1970 |
| DE | 3528426 A1 | 2/1987 |
| DE | 10128287 A1 | 12/2002 |
| DE | 101 23 218 A1 | 1/2003 |
| JP | 59052197 | 3/1984 |
| NL | 8400949 | 10/1985 |

* cited by examiner

*Primary Examiner*—Timothy F. Simone
(74) *Attorney, Agent, or Firm*—Thomas, Kayden, Horstemeyer & Risley, LLP

(57) ABSTRACT

An apparatus (100, 100') for thermally treating a confectionery mass includes a housing (1) having an approximately vertical axis (2), a core (3) being located in the housing (1) and being arranged in an approximately concentric way with respect to the axis (2) of the housing (1), a plurality of tubes (12) being located in the housing (1), each of the tubes (12) having an approximately vertical axis and being designed and arranged for a tempering medium to flow through them, and at least one deflecting element (13) being designed and arranged to connect the housing (1) to the core (3) such that a flow path of the confectionary mass through the apparatus (100, 100') is determined, the flow path extending in a transverse direction with respect to the tubes (12), at least a part of the deflecting element (13) having a helical shape.

15 Claims, 2 Drawing Sheets

US 7,698,995 B2

APPARATUS AND METHOD OF THERMALLY TREATING A CONFECTIONERY MASS

CROSS REFERENCE TO RELATED APPLICATIONS

This application claims priority to co-pending German Patent Application No. 103 26 792.1 entitled "Verfahren und Vorrichtung zur thermischen Behandlung von Süßwarenmasse", filed Jun. 13, 2003.

FIELD OF THE INVENTION

The present invention generally relates to an apparatus and a method for thermally treating a confectionery mass. More particularly, the present invention relates to an apparatus and a method in which a tempering medium flows through a plurality of tubes and the confectionary mass to be tempered contacts the tubes while it flows through the apparatus. The apparatus and method may be used for processing masses containing sugar as well as sugar free masses. Such confectionery masses usually include sugar or sugar substitute substances. Additionally, they may include other ingredients as it is generally known in confectionery products. Thermal treatment is to be understood as relating to a process in which the temperature of the confectionery mass is influenced, especially in the sense of cooking, cooling, solving or mixing different substances under the influence of temperature.

BACKGROUND OF THE INVENTION

An apparatus and a method for thermally treating confectionery masses are known from German Patent Application No. DE 35 28 426 A1 corresponding to U.S. Pat. No. 4,724,754 and from German Patent Application No. DE 101 28 287 A1 corresponding to U.S. Patent Application No. 2002/0185011 A1. The known apparatuses include a case housing having a vertical axis and a plurality of parallel tubes being located close to one another. A heating means, especially steam, flows through the tubes. The case housing at its upper end and at its lower end includes a connecting element for connection of a steam conduit and for removal of the condensate, respectively. The confectionery mass is introduced and removed, respectively, by connecting elements being located perpendicular to the axis of the apparatus. The arrangement is chosen such that the confectionery mass flows through the apparatus from below in an upward direction, and the heating medium flows through the apparatus from above in a downward direction.

Dislocating elements being designed as parallel bottoms are located in the interior of the housing in a spaced apart manner, the tubes extending through the bottoms in a sealed fashion. The bottoms include openings in the form of segment-like holes. The holes are located in the edge portions of opposed sides of the inner wall of the case housing. Another embodiment of the known apparatus includes openings being located in the bottoms, the openings being associated with additional baffle plates. In this way, confectionery mass flows about the tubes being located in the inside of the case housing in a direction transverse to the axes of the tubes along a part of the flow path. However, there are other parts which cannot be used to transmit heat and/or in which the flow path extends parallel to the axes of the tubes. In this way, the layer thickness of the confectionery mass located at the tubes is increased. This causes problems especially with temperature sensitive masses which tend to get burned, especially masses containing milk. In addition, the passage cross section through which the confectionery mass flows along the flow path continuously changes in a disadvantageous way such that there will be substantially different velocities of the confectionery mass. This does not only lead to locally different temperatures of the confectionery mass, but also to the danger of the mass being damaged. The residing time of the particles of the confectionery mass in the known apparatus substantially varies since there may be dead zones and nests along the flow path in which parts of the mass reside too long.

SUMMARY OF THE INVENTION

The present invention relates to an apparatus for thermally treating a confectionery mass. The apparatus includes a housing having an approximately vertical axis, a core being located in the housing and being arranged in an approximately concentric way with respect to the axis of the housing, a plurality of tubes being located in the housing, each of the tubes having an approximately vertical axis and being designed and arranged for a tempering medium to flow through them, and at least one deflecting element being designed and arranged to connect the housing to the core such that a flow path of the confectionary mass through the apparatus is determined, the flow path extending in a transverse direction with respect to the tubes, at least a part of the deflecting element having a helical shape.

The present invention also relates to a method of thermally treating a confectionery mass. The method includes the steps of directing the confectionery mass along a flow path to contact a plurality of tubes in a direction approximately transverse to the main extension of the tubes, the tubes being located in a housing of an apparatus for thermally treating the confectionary mass, the housing having a vertical axis, and directing the confectionery mass along a helical flow path about the vertical axis of the housing. It is preferred to perform the directing steps with the novel apparatus.

With the novel apparatus and method, it is possible to thermally treat a confectionery mass in a way that all mass particles reside in the apparatus for approximately the same time. The mass particles are treated for the approximately identical period of time according to the first in/first out principle. The novel method and apparatus do not use a flow path having a zig-zag-like shape as it is known from the prior art. Instead, a helical or thread-like flow path is used. The flow path extends about the vertical axis of the housing with the tubes being located therein. The flow path extends from the bottom side towards the upper side of the apparatus.

The flow path may either have an approximately constant angle of inclination or a variable angle of inclination, for example by using different angles of inclination in different sections of the housing. The cross section through which the mass flows—the so called passage cross section—is approximately constant along the flow path such that the confectionery mass flows through the apparatus without substantial changes of velocity. As a result, there will be an approximately constant flow of confectionery mass through the apparatus at an approximately constant velocity of the confectionery mass. Undesired dead zones in which the mass is not moved are prevented. The mass contacts the tubes in a transverse direction and in a perpendicular way or an approximately perpendicular way.

The helical flow path may have an approximately constant angle of inclination along the entire height of the apparatus such that the passage cross section of the confectionery mass also is approximately constant. On the other hand, it is also possible to vary the angle of inclination along the height of the apparatus. Especially, it is possible to use a progressively increasing height and an approximately constant width of the passage cross section along the flow path. Such a desired increase of the passage cross section at certain locations of the flow path may be used to introduce additional ingredients via additional connecting elements. It is especially preferred to use a passage cross section which increases along the flow path in case the apparatus is designed as a cooking apparatus, for example for treating a saccharose solution or glucose syrup solution, and when steam is produced during the cooking operation. It is easier to remove the steam when using the increased passage cross section.

However, it is also possible to arrange different parallel levels along the height of the apparatus, the levels extending about less than 360° of the circumference of the housing of the apparatus. The levels are interconnected by inclined transitions the angle of inclination of which is approximately 10° to 30°, especially approximately 20°. In this way, at least approximately 340° of the circumference may be partly filled with tubes which may be used for the desired transfer of heat to the confectionary mass. However, it is also possible to additionally arrange tubes in the portion where the inclined transitions are located.

The apparatus for thermally treating the confectionery mass includes a core which extends about the vertical axis of the housing of the apparatus in a concentric way. The core is not used to transfer heat. The core limits the passage cross section in a radial inward direction, while the housing limits the cross section in a radial outward direction. The passage cross section is further limited by deflecting elements defining the upper limit and the lower limit of the passage cross section. The novel apparatus has the advantage of ensuring that there will be no substantial dead centers, and that the confectionery mass will flow through the apparatus at an approximately constant velocity. The confectionery mass flowing through the apparatus contacts the tubes in a direction approximately transverse to the main extension of the tubes. These uniform streaming conditions of the tubes have a positive effect on the quality of the thermal treatment of the confectionery mass and of the confectionery products to be produced. When using such a design of the novel apparatus including an inner core, not only the case housing, but also the core may be used for connection of additional connecting elements to introduce additional ingredients into the mass or to remove a part of the mass during thermal treatment.

The at least partly helical deflecting element may be designed to have a constant angle of inclination. Alternatively, it may be designed to have a variable angle of inclination. The angle of inclination may increase in a progressive way. The changes of the angles of inclination may also only relate to certain portions of the flow path. Consequently, the passage cross section may either be approximately constant or increasing.

The tubes may be arranged in a comparatively close manner at different distances with respect to one another and/or the tubes may have different outer diameters. In this way, the cross sectional profile of the velocities in the annular cross section may be influenced. For example, it is possible to design and arrange the tubes in a radial inward direction such that one attains greater flow resistance than in a radial outward direction. In this way, one may use decreased velocities at radial inside locations where the flow path is shorter compared to radial outside locations where the flow path is longer to maintain the first in/first out principle for almost all mass particles of the confectionery mass. Another possibility is to arrange the tubes in a uniformly spaced apart manner and to design them to have an approximately identical outer diameter, and to take other measures. For example, the mass flow of confectionery mass may be partially dislocated from a radial inside place towards the outside and vice versa such that practically all mass particles reside in the apparatus for approximately the same period of time.

Especially, the heat exchanger may be designed to include a plurality of approximately parallel levels having approximately constant passage cross sections and extending about less than 360° of the circumference of the apparatus. The levels formed in this way are interconnected by thread-like guiding plates. The portions of these thread-like guiding plates may be simultaneously used to arrange rearranging plates for moving the confectionery mass from a radial inward place towards a radial outward location and vice versa. In addition, swirling plates may be located almost at any place in the flow path to intensively mix the confectionery mass and to even out the respective temperatures of the confectionery mass.

The housing and/or the core of the heat exchanger may be designed to include two walls and to be connected to a tempering circuit such that tempering medium may flow through the gaps being located between the walls. It is also possible to use other heating elements or cooling elements. The core of the heat exchanger is especially made of a tube having an outer diameter which is respectively smaller than the outer diameter of the housing. Usually, the cross section of the housing and/or the cross section of the core is circular. However, it is also possible to use different cross sections. It is preferred to use a circular design to simplify manufacture of the apparatus. Especially, such a circular design is preferred in case the apparatus is used under the influence of pressure.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
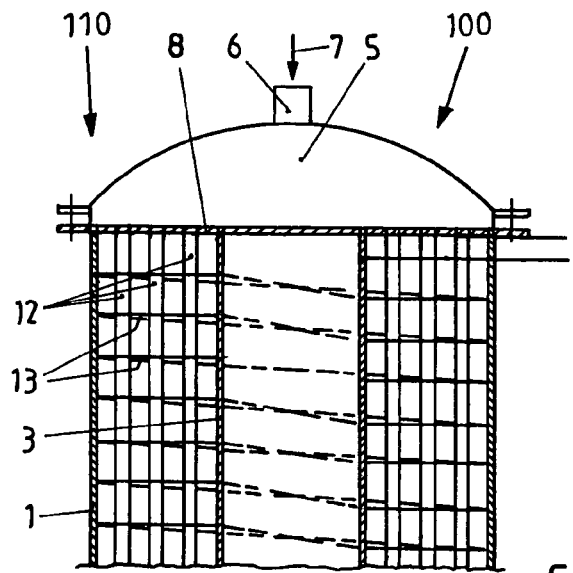
FIG. 1 is a perspective schematic view of a first exemplary embodiment of the novel apparatus.
Figure 2:
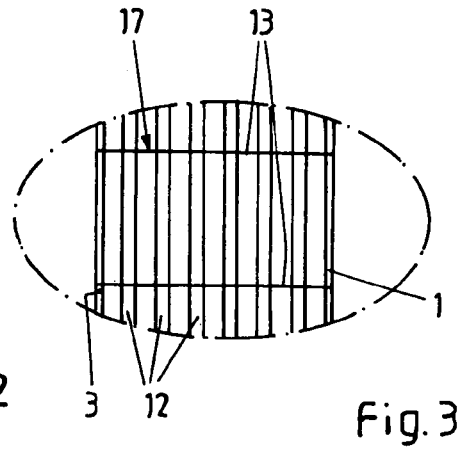
FIG. 2 is a view of a vertical section through the upper part of the apparatus according to FIG. 1.

Referring now in greater detail to the drawings, FIG. 1 illustrates a first exemplary embodiment of the novel apparatus 100 in a schematic perspective way. The apparatus 100 is designed as a heat exchanger 110. The heat exchanger 110 includes a housing 1 which extends concentrically about a vertical axis 2. A core 3 is arranged in a radial inward direction to also extend concentrically about the axis 2. The core 3 is also designed similar to a tube and to a housing, respectively. The housing 1 at its upper portion is connected to a cover 4 and at its lower portion is connected to a cover 5. The covers 4 and 5 have a shape similar to a dome. The covers 4 and 5 are fixedly connected to the housing 1. The cover 5 includes an inlet connection 6 which may be used for steam when the apparatus 100 is used as a steam cooking apparatus. The steam is introduced into a chamber within the cover 5 according to arrow 7. This chamber is limited by an annular bottom 8. The cover 4 may have a corresponding symmetrical design. It includes an outlet connection 9 by which condensate and the respective tempering medium, respectively, exits the apparatus 100 according to arrow 10. The interior of the cover 4 is limited by a respective bottom 11 which is only schematically illustrated in FIG. 1. The bottoms 8 and 11 may have identical designs.

Figure 3:
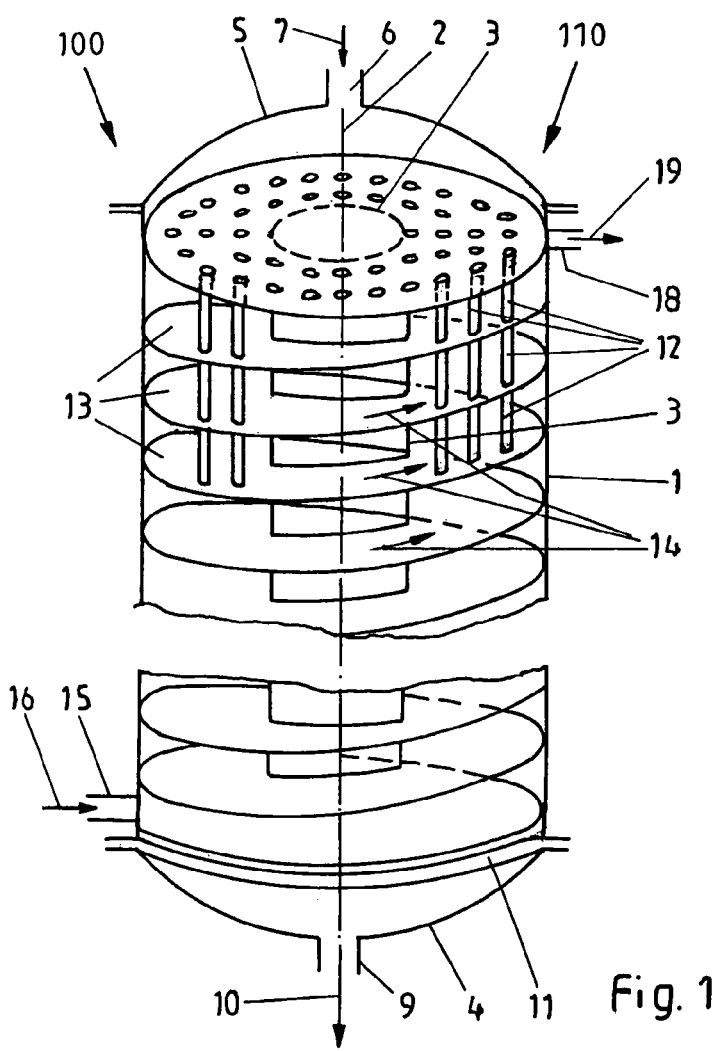
FIG. 3 is a view of a detail of FIG. 2.

A majority of tubes 12 extends between the bottoms 8 and 11. The tubes 12 may be arranged to be uniformly distributed about the surface of the apparatus 100, or to be arranged in bunches of tubes 12. The axes of the tubes 12 are arranged to be parallel to the axis 2 of the case housing 1. Tempering medium flows through the tubes 12. The interior of the apparatus 100 between the housing 1, the core 3 and the two bottoms 8 and 11 is separated by a deflecting element 13 extending through the interior of the apparatus 100. The deflecting element 13 may be made of sheet metal being at least partly deformed to have a thread-like shape and to extend about the axis 2 with a constant or a variable angle of inclination. The tubes 12 also protrude through the deflecting element 13. The tubes 12 extend through the bottoms 8 and 11 and the deflecting element 13 in a sealed manner with respect to liquids and in a pressure tight manner, respectively. In this way, there is a helical flow path about the axis 2. The flow path is illustrated by arrows 14. A connection element 15 is located at the housing 1. The confectionery mass enters the heat exchanger 110 through the connection element 15 according to arrow 16. The confectionery mass contacts the tubes 12 in a transverse direction, and it flows about the tubes 12 in a transverse direction with respect to the main extension of the tubes 12. The movement of the mass takes place along a defined flow path. The confectionery mass flows along the entire height of the heat exchanger 110. In case the deflecting element 13 is designed to have a constant angle of inclination, the confectionery mass flows through a rectangular passage cross section 17 at all places which is especially to be seen in FIG. 3 The passage cross section 17 has a rectangular design. It has a width extending in a radial direction from the core 3 to the case housing 1, while the height is defined by the distance between two adjacent convolutions of the deflecting element 13. It is to be understood that the height of the passage cross section 17 varies in case the angle of inclination of the deflecting element 13 is variable. Such a design may be chosen to attain an increasing passage cross section 17 along the flow path, for example. The case housing 1 at its upper end below the bottom 8 includes a connecting element 18 through which the thermally treated confectionery mass exits the heat exchanger 110 according to arrow 19.

Figure 4:
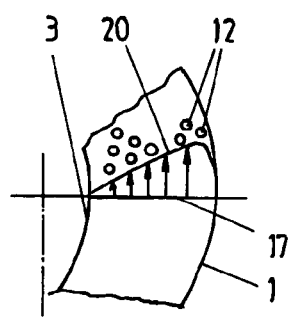
FIG. 4 is a view of a horizontal section.

FIG. 4 illustrates a velocity profile 20 in a radial direction through the passage cross section 17. It may be desired to vary the local resistance by the tubes 12 being located in the passage cross section 17 in a radial direction by a special arrangement of the tubes 12. Such an arrangement has an influence on the velocities about the cross sectional profile which is illustrated by arrows in FIG. 4. For example, it is possible to arrange the tubes 12 in the portion close to the core 3 in a closer manner and/or to use tubes 12 having a greater outer diameter compared to the tubes 12 being located in a radial outside direction close to the housing 1. Such a design results in an asymmetric cross sectional profile of the velocities in a radial direction to realize the first in/first out principle. However, it is also possible to arrange the tubes 12 in a uniformly spaced apart manner. In this case, the resistance acting upon the confectionery mass caused by the tubes 12 is constant in a radial direction. Due to the fact that the flow path is shorter at radial inward places compared to radial outward places, there will be respective differences of velocities of the respective particles of the confectionery mass depending on the place where they are located.

Figure 5:
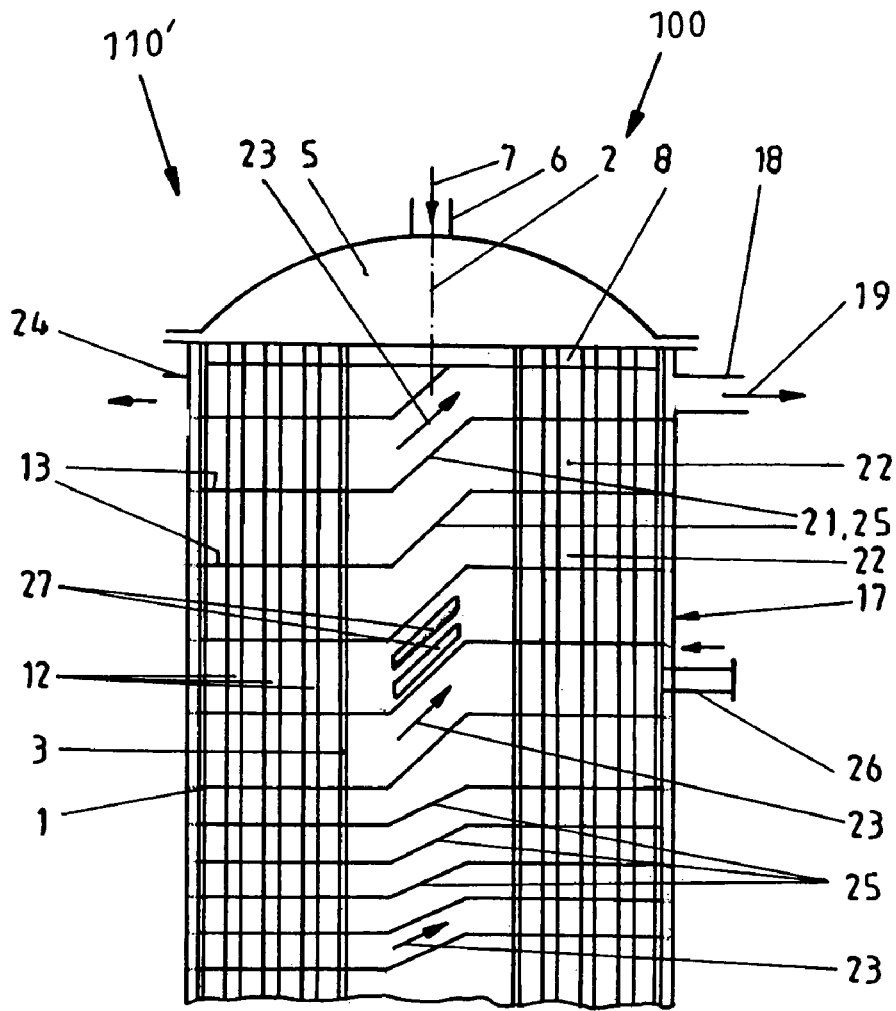
FIG. 5 is a view of a vertical section of the upper portion of a second exemplary embodiment of the novel apparatus.
Figure 6:
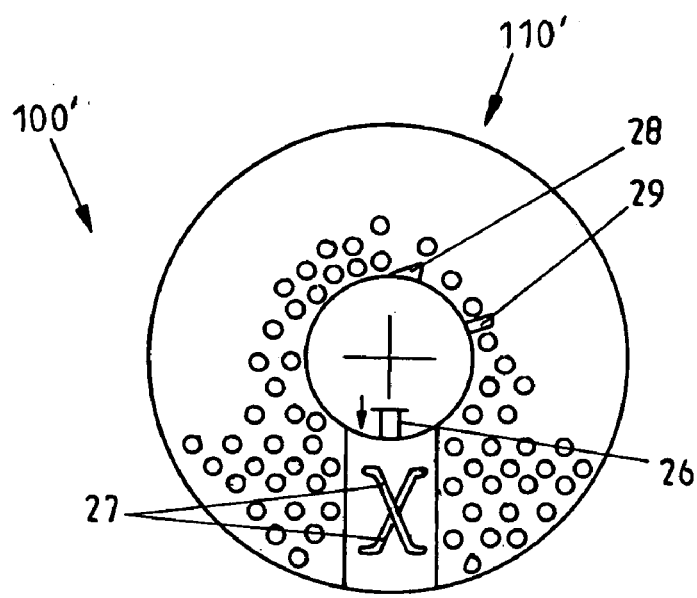
FIG. 6 is a view of a horizontal section through the apparatus according to FIG. 5.

FIGS. 5 and 6 illustrate another exemplary embodiment of the novel apparatus 100'. The apparatus 100' generally has a similar design as the apparatus 100 according to FIGS. 1 to 4. However, a plurality of deflecting elements 13 are located in the interior between the core 3, the housing 1 and the two bottoms 8 and 11. The deflecting elements 13 are formed by sector-like sheet metals extending about the axis 2 with no increase of height and to extend about approximately 340°. The deflecting elements 13 are arranged to be approximately perpendicular with respect to the tubes 12, and the tubes 12 extend through the deflecting elements 13 in a perpendicular way. In addition to the deflecting elements 13, here are transitions 21. Each transition 21 connects two adjacent levels 22 being formed by the deflecting elements 13. In this way, only the transitions 21 are designed to have a helical shape. In this way, only the transitions 21 are designed and arranged similar to a spiral line such that the confectionery mass flowing through the passage cross sections 17 only moves in an upward direction in the region of the transitions 21 to reach the level 22 being located thereabove. The flow path is illustrated by arrows 23 in FIGS. 5 and 6.

In this embodiment of the apparatus 100', the housing 1 is designed to include two walls to form a protecting heating. The interior formed between the two walls is connected to a tempering circuit 24. Correspondingly, the core 3 may also be designed to include two walls between which a tempering medium flows. For reasons of clarity of the drawings, this design of the core 3 is not illustrated.

The transitions 21 are formed by thread-like guiding plates 25. FIG. 5 illustrates the arrangement of guiding plates 25 having different angles of inclination in connection with different heights of the levels 22. Such a design may be preferred when the confectionery mass flowing through the heat exchanger 110' is to flow through a greater cross section during thermal treatment of the confectionery mass, for example. The same applies when it is desired to introduce additional substances to the confectionery mass through an additional connecting element 26. It is also possible to alternatively or additionally arrange such connecting elements 26 in the region of the core 3, as this is illustrated in FIG. 6.

The region of the transitions 21 between the guiding plates 25 may be used for the arrangement of rearranging plates 27. Such rearranging plates 27 may have a blade-like design. Usually, they are arranged as pairs, and they serve to dislocate mass flowing in the region of a level at a radial inward place towards a radial outward place along a circular flow path and vice versa. In this way, mass particles flowing in a lower level at a radial inward place are dislocated in a radial outward direction in the level arranged above. This change and displacement of mass flows and mass particles from the inside towards the outside and vice versa is attained along the height of the heat exchanger 110' to make sure that all mass particles flow through the heat exchanger 110' with approximately the same residing time, approximately the same velocity and approximately the same thermal treatment. It is to be understood that the tubes 12 may be arranged in a uniformly spaced apart manner in combination with the rearranging plates 27.

Swirling plates 28 and 29 of various designs may be located at various places of the cross section of the apparatus 100' to achieve an additional swirling effect of the confectionery mass during its flow through the passage cross sections 17. Usually, such swirling plates 28, 29 are not necessarily required since the mass is already swirled and mixed when flowing around the tubes 12.

Many variations and modifications may be made to the preferred embodiments of the invention without departing substantially from the spirit and principles of the invention. All such modifications and variations are intended to be included herein within the scope of the present invention, as defined by the following claims.

We claim:

1. An apparatus for thermally treating a confectionery mass, comprising:
    a housing having an approximately vertical axis;
    a core, said being located in said case housing, said core being arranged in an approximately concentric way with respect to the axis of said housing;
    a plurality of tubes, said tubes being located in said housing, each of said tubes having an approximately vertical axis and being designed and arranged for a tempering medium to flow through them; and
    at least one deflecting element, said deflecting element being designed and arranged to connect said housing to said core such that a flow path of the confectionary mass through said apparatus is determined, the flow path extending in a transverse direction with respect to said tubes, at least a part of said deflecting element having a helical shape.

2. The apparatus of claim 1, wherein the flow path has a passage cross section through which the confectionery mass to be tempered flows, the passage cross section having an approximately rectangular shape and being approximately constant along the flow path.

3. The apparatus of claim 2, wherein said tubes are designed and arranged to extend through the passage cross section.

4. The apparatus of claim 1, wherein said deflecting element is designed and arranged to have an approximately constant angle of inclination.

5. The apparatus of claim 1, wherein only a part of said deflecting element is designed and arranged to have an approximately constant angle of inclination.

6. The apparatus of claim 1, wherein at least a part of said deflecting element is designed and arranged to have an increasing angle of inclination.

7. The apparatus of claim 1, wherein said tubes have approximately the same diameter.

8. The apparatus of claim 1, wherein said tubes are arranged to be inconstantly spaced apart said apparatus.

9. The apparatus of claim 1, wherein said deflecting element includes a plurality of approximately parallel horizontal levels and at least one guiding plate, said guiding plate having a helical shape, said guiding plate being designed and arranged to interconnect two adjacent levels.

10. The apparatus of claim 9, wherein said apparatus has a circumference, said levels being designed and arranged to extend about less than 360° of the circumference of said apparatus.

11. The apparatus of claim 1, further comprising at least one rearranging plate, said rearranging plate being designed and arranged to direct the confectionery mass in a radial outward direction.

12. The apparatus of claim 1, further comprising at least one rearranging plate, said rearranging plate being designed and arranged to direct the confectionery mass in a radial inward direction.

13. The apparatus of claim 1, further comprising a plurality of first and second rearranging plates, said first rearranging plates being designed and arranged to direct the confectionery mass in a radial outward direction, said second rearranging plates being designed and arranged to direct the confectionery mass in a radial inward direction.

14. The apparatus of claim 1, further comprising a plurality of swirling plates, said swirling plates being designed and arranged to mix the confectionery mass.

15. The apparatus of claim 1, wherein the confectionery mass is selected from the group consisting of candy mass, caramel mass and fondant mass.

* * * * *